United States Patent
Sinclair (10) Patent No.: US 9,811,840 B2
(45) Date of Patent: Nov. 7, 2017

(54) CONSUMER INTERFACE DEVICE SYSTEM AND METHOD FOR IN-STORE NAVIGATION

(71) Applicant: THE SINCLAIR GROUP, INC., Lake Forest, IL (US)

(72) Inventor: Craig M. Sinclair, Lake Forest, IL (US)

(73) Assignee: THE SINCLAIR GROUP, INC., Lake Forest, IL (US)

( * ) Notice: Subject to any disclaimer, the term of this patent is extended or adjusted under 35 U.S.C. 154(b) by 0 days.

(21) Appl. No.: 13/943,602

(22) Filed: Jul. 16, 2013

(65) Prior Publication Data

US 2014/0019300 A1 Jan. 16, 2014

Related U.S. Application Data (60) Provisional application No. 61/672,238, filed on Jul. 16, 2012.

(51) Int. Cl.
G06Q 30/06 (2012.01)
G06Q 30/02 (2012.01)

(52) U.S. Cl.
CPC ..... G06Q 30/0246 (2013.01); G06Q 30/0639 (2013.01); G06Q 30/0641 (2013.01)

(58) Field of Classification Search
CPC ............................ G06Q 30/06; G06Q 30/08
USPC ................................ 705/26.1–27.2
See application file for complete search history.

(56) References Cited

U.S. PATENT DOCUMENTS

| | | | |
|---|---|---|---|
| 6,253,151 B1 * | 6/2001 | Ohler et al. | 701/409 |
| 6,624,757 B1 | 9/2003 | Johnson | |
| 7,287,001 B1 | 10/2007 | Falls et al. | |
| 7,309,009 B2 * | 12/2007 | Singer-Harter | 235/383 |
| 2002/0115341 A1 * | 8/2002 | Hein et al. | 439/495 |

(Continued)

FOREIGN PATENT DOCUMENTS

WO WO-2012129216 A1 9/2012

OTHER PUBLICATIONS

U.S. Appl. No. 13/943,616, Sinclair, C., filed Jul. 16, 2013.

(Continued)

*Primary Examiner* — Ethan D Civan
*Assistant Examiner* — Ming Shui
(74) *Attorney, Agent, or Firm* — Marshall, Gerstein & Borun LLP; Randall G. Rueth (57) ABSTRACT

A consumer interface device ("CID") implemented in a retail store provides an interactive in-store shopping experience. In particular, the CID may provide in-store navigation to a desired product. The CID may receive input from a user specifying the desired product, or the CID may suggest a product and provide navigation to the desired and/or suggested product. The CID may be mounted on a shelf in a retail store and may include a microprocessor, a touchscreen, a digital storage medium, and a networking device. The CID may track the success of particular in-store advertisements with regard to particular consumers or types of consumers; provide in-store navigation to products; enable purchases via a network; and target an individual consumer or group of consumers with product content specifically directed to the respective consumers or groups of consumers.

25 Claims, 7 Drawing Sheets

(56) References Cited

U.S. PATENT DOCUMENTS

| | | | |
|---|---|---|---|
| 2002/0120582 A1* | 8/2002 | Elston | G06Q 20/04 705/64 |
| 2002/0147642 A1 | 10/2002 | Avallone et al. | |
| 2003/0189529 A1 | 10/2003 | Martinez et al. | |
| 2004/0230482 A1 | 11/2004 | Hendrickson | |
| 2005/0187819 A1 | 8/2005 | Johnson | |
| 2007/0219866 A1 | 9/2007 | Wolf et al. | |
| 2007/0279315 A1 | 12/2007 | Laves et al. | |
| 2008/0238615 A1 | 10/2008 | Carpenter | |
| 2008/0249859 A1 | 10/2008 | Angell et al. | |
| 2008/0255894 A1 | 10/2008 | Falls et al. | |
| 2008/0301102 A1* | 12/2008 | Liang | G06Q 10/08 |
| 2008/0306820 A1 | 12/2008 | Passmore | |
| 2009/0157472 A1 | 6/2009 | Burazin et al. | |
| 2009/0182623 A1 | 7/2009 | Baltimore | |
| 2012/0120327 A1 | 5/2012 | Marx et al. | |
| 2012/0259732 A1* | 10/2012 | Sasankan | 705/26.9 |
| 2013/0073369 A1 | 3/2013 | Begum | |
| 2013/0124261 A1 | 5/2013 | Wilder et al. | |
| 2013/0290140 A1 | 10/2013 | Frankel et al. | |

OTHER PUBLICATIONS

U.S. Office Action for U.S. Appl. No. 13/943,616, dated May 1, 2015.
U.S. Office Action for U.S. Appl. No. 13/294,282, dated Sep. 30, 2014.
U.S. Final Office Action for U.S. Appl. No. 13/294,282, dated Apr. 24, 2015.
U.S. Office Action for U.S. Appl. No. 13/943,616, dated Nov. 7, 2016.

* cited by examiner

CONSUMER INTERFACE DEVICE SYSTEM AND METHOD FOR IN-STORE NAVIGATION

CROSS-REFERENCE TO RELATED APPLICATIONS

This patent claims priority to U.S. Provisional Application No. 61/672,238 filed Jul. 16, 2012, entitled "Consumer Interface Device System and Method for Enhanced Consumer Shopping Experience," which is hereby incorporated by reference for all purposes.

TECHNICAL FIELD

The present invention relates to retail product promotion, and more particularly to consumer interface devices for providing in-store navigation capabilities to consumers and enhancing consumer shopping experiences.

BACKGROUND

In retail marketing, for example grocery stores, drug stores, department stores, and mass merchants, advertising and product information displays take up valuable space within the physical store. Also, advertising and product information requires dedicated employees to keep up to date, which translates to costs of time and money. Advertising and product information may be appropriate and usefully employed in one location but inappropriate and not usefully employed in a second location. For example, placement of advertising and product information specific to a cosmetic product may be decidedly inappropriately placed in the sporting goods section of a department store or modern drug store. It may be likely a key to effective in-store advertising to place the advertising copy and associated information relating to products that are either on nearby retail store shelves or near other products that are related as to use, as in advertising a cosmetic product near a display of application brushes and similar products.

Current techniques for providing in-store advertising and product information often involve using print advertising. The print advertising often includes a price or promotional offer. Other techniques involve using a kiosk or computer for displaying a preconfigured video or series of images containing advertising messages, where a store employee or contractor manually selects the desired advertising messages and an order for displaying the advertising messages before the kiosk or computer may display the advertising messages. Such videos or images are often preconfigured in the sense that the advertisement(s) to be displayed and the order in which the advertisements are to be displayed is manually selected ahead of time by an employee or contractor responsible for managing the kiosk or computer.

SUMMARY

The present invention provides a consumer interface device system for enhancing consumer shopping experiences in retail store or other public space settings. In particular, the consumer interface device system may provide in-store navigation to a desired product. The consumer interface device (CID), in an embodiment, may be a touch screen device that can be free-standing, part of a kiosk, mounted on a merchandising shelf, or placed in similar ways that will allow a consumer to interact with the device to gain information, receive coupons, conduct transactions, or provide input. The CID, in an embodiment, further contains a storage medium, a network connection that allows data and content to be both delivered and collected, and a barcode scanner or RFID scanner that will allow a product to be scanned and identified. Software may be included to enable a variety of features and components of the CID, such software either present on the storage medium or on a remote server accessible by the CID.

An embodiment of the CID includes a magnetic card reader, which may be used to allow consumers to perform functions such as entering their loyalty or club membership card information, providing credit/debit/gift cards for payment, entering insurance information, or for collecting data from a variety of other similar cards with magnetic strips that are commonly carried by a customer or a store employee.

An embodiment of the CID includes a digital video camera that may be used for a variety of purposes. The digital video camera may be enabled for facial recognition of consumers interacting with the CID, which facial recognition may be limited to assessment of age and/or gender for purposes of verifying that the user of a credit card or debit card may be consistent with the person known to own the particular credit card or debit card. Alternatively, the facial recognition may confirm the identity of the consumer. The facial recognition function, without relating to the consumer's identity, can nonetheless aid advertisers in verifying age, gender, dwell times, and other important advertising metrics.

The digital video camera may also be employed to connect the consumer to a real time consultant/expert/interviewer at a remote location. Accordingly, information can be provided or collected using the resources of a highly trained individual, whose cost can be spread over multiple locations due to the remote connections and communications capability of the CID.

The facial recognition capability may be used to import to the screen the consumer's likeness for, for example, virtually applying products, such as cosmetics or eyeglasses or hats etc. To say the least, the CID in this embodiment can help instruct a consumer how a product works, as in the application of a cosmetic product that the consumer may be unfamiliar with; the CID can also dramatically expand the inventory of available alternative products that may be desirably purchased by the consumer, as in the examples of eyeglasses or hats.

Some embodiments of the CID may include printers to output a variety of documents, such as coupons, recipes, shopping lists, directions, receipts, etc. Telephone receivers may optionally be connected to the CID to assist with customer service from remote locations; alternatively, the CID may contact the consumer using the consumer's mobile phone by including a telephonic function using contact data stored in a loyalty program entry for the consumer, for example. A microphone may also be included to enable voice recognition capabilities of the CID. A speaker may also be included to enable audio output capability of the CID.

The CID system may be utilized in a variety of manners. For example, the CID may be used to evaluate the sales-promoting capacity of product content presented to consumers interacting with the CID. The CID may receive input related to at least one product from the consumer and searches for product content related to the at least one product. The product content may be displayed on the CID to the consumer, and any purchase decision of the consumer may be tracked and associated with the product content. The method may optionally include interacting with a loyalty program database to track the consumer's purchase decision and/or associated product content.

The CID may direct the consumer to the location of a product, service, or object within a retail or public space. To accomplish this, the CID may interact with a planogram database that provides the location of a product, service, or object in the retail or public space. The planogram database may be a component of a database established in the digital storage medium of the CID or in digital storage medium of the remote server with which the CID communicates or both. In a retail setting, the consumer may be directed, for example, to an electronic shelf display system that may be in communication with the planogram database; such electronic shelf display systems include those described in co-pending and co-owned U.S. Patent Applications 20100249994 and 20120120327, both of which are included herein by reference in their respective entireties.

A computer-implemented method for interactive shopping at a retail store may comprise causing a processor, coupled to a touchscreen, to determine whether the touchscreen received input; causing the processor to identify, based on the received input, a first product; causing the processor to generate a query, the query representing a request for information associated with the first product; causing the processor to transmit the query to an inventory system, wherein the inventory system includes data regarding one or more products available for purchase at the retail store; causing the processor to receive a response to the query; causing the processor to determine, based on the response to the query, that the first product is available for in-store purchase; causing the processor to receive information indicating a location of the first product within the retail store; when the first product is located on a shelf, causing the processor to receive, from a planogram system, information indicating a shelf placement for the first product; and causing the processor to provide a display at the touchscreen for navigating to the first product, wherein the touchscreen displays an image of the first product on a shelf when information indicating a shelf placement for the first product has been received.

A consumer interface device for providing an interactive shopping experience in a retail store may comprise a touchscreen attached to a housing; a processor coupled to the touchscreen; a networking device coupled to the processor; and a digital storage medium, coupled to the processor, including non-transitory computer readable instructions that, when executed at the processor, cause the processor to: (a) determine the touchscreen has received input; (b) identify, based on the received input, a first product; (c) generate one or more queries representing one or more requests for information regarding the first product; (d) transmit, via the networking device, the one or more queries; (e) receive, via the networking device, one or more responses to the one or more queries; (f) determine, based on the one or more responses: (i) availability of the first product for in-store purchase, (ii) a location of the first product within the retail store, and (iii) when the first product is located on a shelf, an indication of a position of the first product on a shelf; and (g) provide, at the touchscreen, a display for in-store navigation to the first product, wherein the touchscreen displays an image showing the position of the first product on the shelf when an indication of shelf position has been received.

A tangible computer readable medium may include non-transitory computer readable instructions that, when executed, cause one or more processors to: determine a touchscreen has received input; identify, based on the received input, a first product; generate one or more queries representing one or more requests for information regarding the first product; transmit, via the networking device, the one or more queries; receive, via the networking device, one or more responses to the one or more queries; determine, based on the one or more responses: (i) availability of the first product for in-store purchase, (ii) a location of the first product within the retail store, and (iii) when the first product is located on a shelf, an indication of a position of the first product on a shelf; and provide, at the touchscreen, a display for in-store navigation to the first product, wherein the touchscreen displays an image showing the position of the first product on the shelf when an indication of shelf position has been received.

DETAILED DESCRIPTION OF THE PREFERRED EMBODIMENTS

Figure 1:
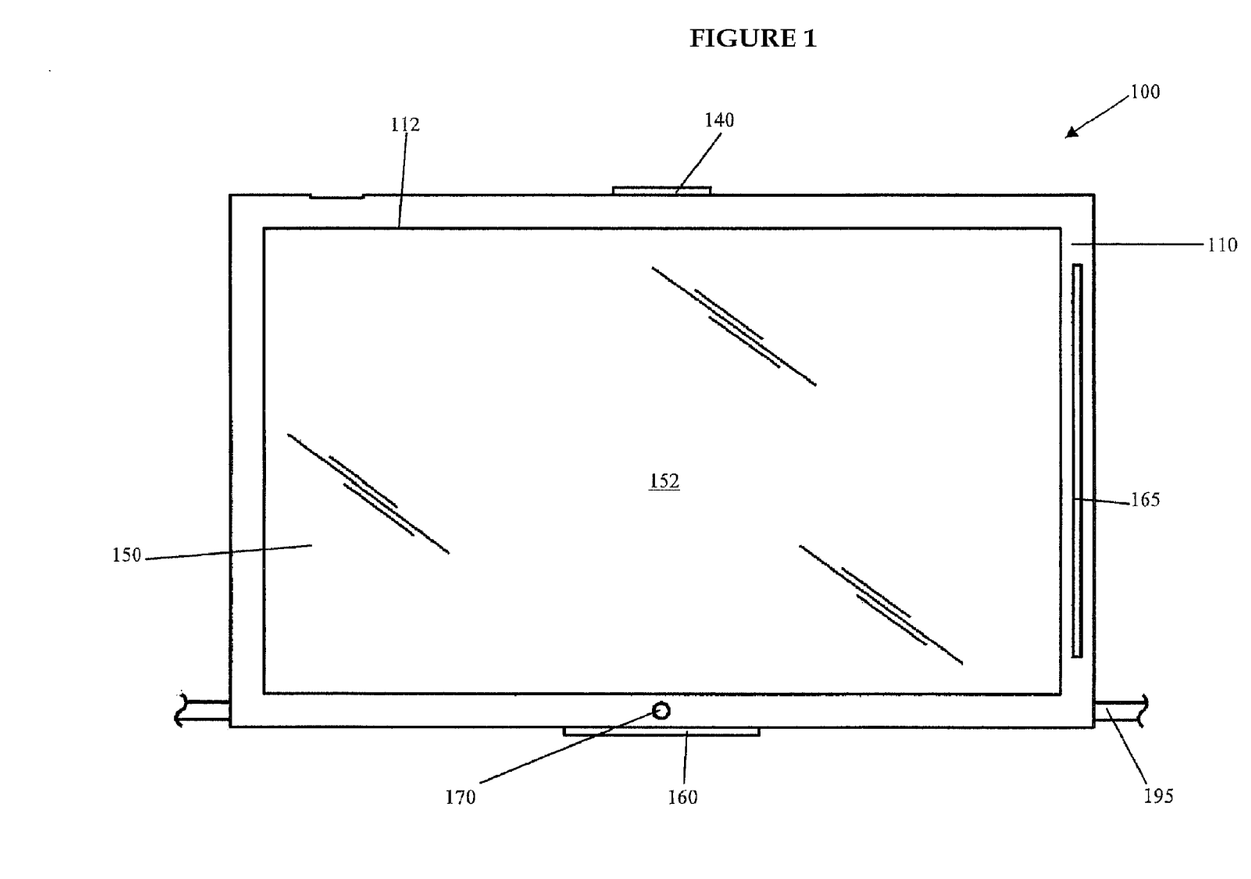
FIG. 1 shows a front view of an example consumer interface device.

FIG. 1 shows a front view of an example consumer interface device 100 (CID 100). In an embodiment, the CID 100 (front view, see FIG. 1; rear view, see FIG. 2) comprises a housing 110 defining an internal volume (for internal connections, see FIG. 3) that may contain, among other potential components, a processor, a digital storage medium, and/or a networking device. The housing 110 may further comprise an opening 112 within which a visual display 150 may be situated, the visual display 150 being attached to the housing 110 such that an imaging surface 152 of the visual display 150 faces outward, away from the internal cavity of the housing 110. The housing 110 may be affixed to the shelf 195 via a hardware mount. The visual display 150 may be in electronic communication with the microprocessor 120 to display images and video. In an embodiment, the visual display 150 may be a touchscreen. Any components or devices that receive or capture input to the CID 100 (e.g., a touchscreen, the scanner 160, the RFID reader/scanner discussed below, a camera, the network device, or any other component/device/port for receiving input to the CID 100) may be referred to collectively, or in part, as the "input interface" throughout the detailed description.

The CID 100 offers a number of beneficial features in comparison to existing in-store advertising systems. For example, and as discussed in more detail below, the CID 100 enables precise, accurate tracking of the success of particular in-store advertisements. A retail store may implement the CID 100, for example, to determine how successful a particular advertisement (or other product content) may be in leading to a sale of a product for a particular consumer or group of consumers. In particular, a store may utilize the CID 100 to determine when a particular consumer or type of consumer has been exposed to product content displayed at the CID 100. The store may then use the CID 100, alone or in conjunction with other systems, to track the purchase decision of the consumer for that particular shopping session, enabling the store to further implement the CID 100 to analyze collected data and identify a correlation between the product content and the consumer's purchase decision.

Moreover, in comparison to previous in-store advertising techniques, the CID 100 offers an interactive shopping experience that improves a consumer's ability to locate and purchase a desired product. For example, the CID 100 enables a store to provide an interface to a consumer for quickly navigating the consumer to a desired product in the store. This interface allows the store to avoid alienating a consumer, who may otherwise waste time searching the store for a desired product, which may lead to feelings of frustration toward the store. By preventing consumers from developing feelings of ill will that may result in losing the consumer's business, the CID 100 may enable a store to retain customers.

Similarly, and in further contrast to previous in-store advertising techniques, the CID 100 allows retail stores to offer an interface to consumers for in-store purchases, via a network (e.g., via the internet or a LAN), of products that are currently out of stock. Unlike current systems that may require placing a phone call or acquiring the help of a store employee for arranging a purchase of an unstocked item, the CID 100 enables a consumer to directly interact with an interface for a quick purchase of a product via a network. For example, a consumer may use the CID 100 to (i) quickly determine a product may be not stocked, and then (ii) purchase the product via a network.

Furthermore, the CID 100 may be used to provide product content targeted to a particular consumer or type of consumer. Based on data collected at the CID 100, unique market segments and/or consumer spend/potential spend penetration metrics may be identified. For example, a consumer profile for a particular consumer or segment of consumers may be developed. The consumer profile may include consumer preference or behavior data useful for analytics, including data relating to spending history or habits and/or preference for brands, products, product types, shopping times, etc. For example, a retail store may implement the CID 100 to identify an in-store consumer (via, e.g., biometric identification or radio-frequency identification) and determine certain characteristics or preferences of the consumer based on collected information relating to the particular consumer (e.g., a purchase history) or relating to consumers sharing particular characteristics (e.g., gender, height, age, weight, hair color, etc.). For example, a store may be able to determine, based at least in part on data collected at the CID 100, that men between the ages of 25-35 with a height greater than six feet tend to be interested in a target product or product type (e.g., basketball related equipment). The CID 100 may further determine product content (e.g., advertisements, promotions, demonstrations) correlated to a successful sale for (i) a particular group or segment of consumers, and/or (ii) a particular product or type of product. The CID 100 may be used to provide product content (e.g., a promotional offer involving sporting equipment), given the consumer preference or group of consumer preferences and/or given the target product or product type. Consequently, the product content may be directed to the particular consumer, type of consumer, product, and/or product type. The CID 100 and the associated benefits are further described below.

Figure 2:
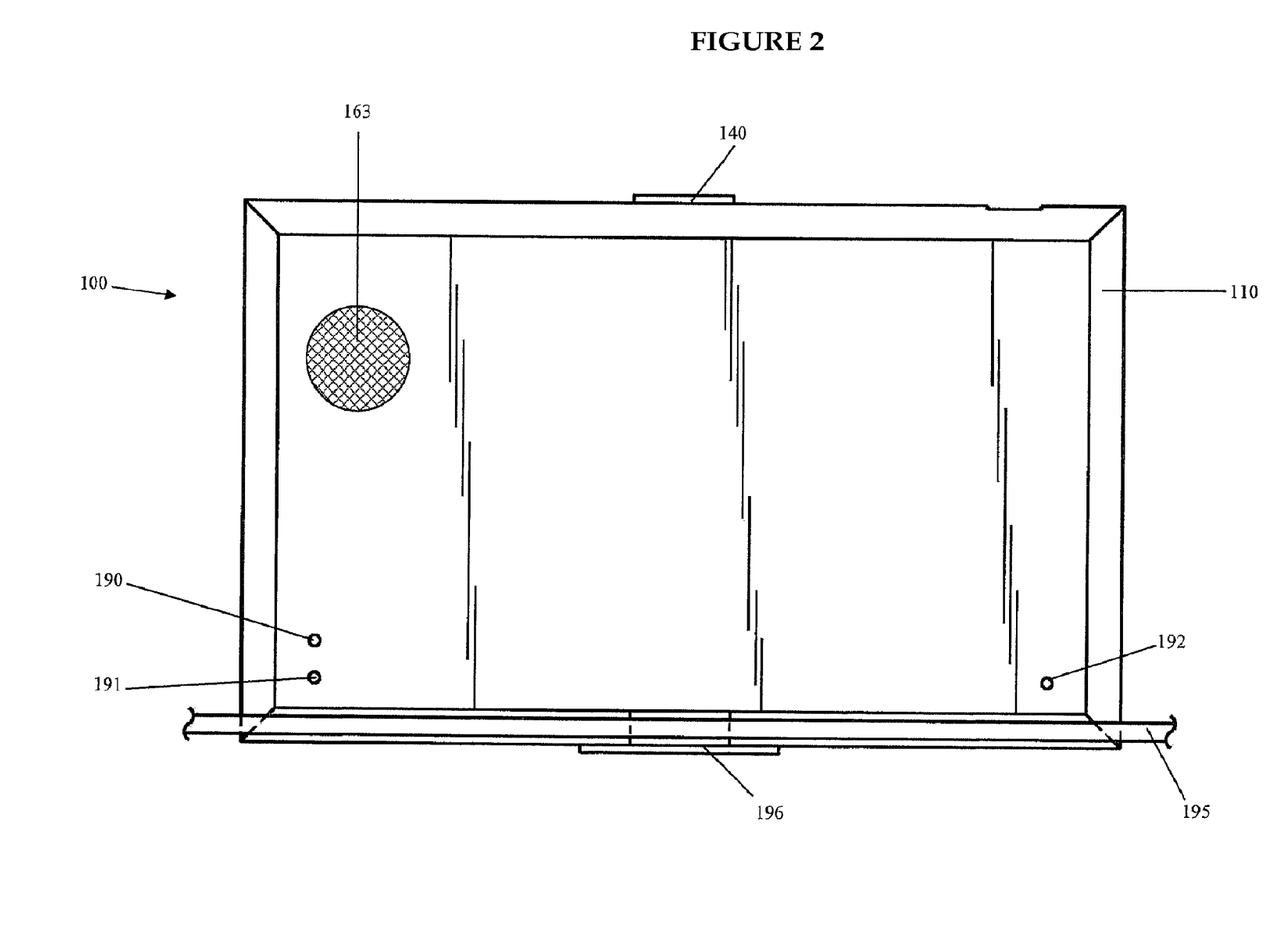
FIG. 2 shows a rear view of an embodiment of the consumer interface device.

FIG. 2 shows a rear view of the CID 100. The CID housing 110 may include a hardware mount 196 for attaching the CID 100 to a shelf 195. The CID 100 may further comprise a speaker 163 disposed within an aperture of the housing 110 that may be in electronic communication with the microprocessor 120. In other embodiments, the speaker 163 may be located at a different location on the housing 110; and may be located on other sides of the CID 100 such that the speaker may be physically closer to the site of the consumer at the front of the CID 100; additionally, the CID 100, in other embodiments, can include multiple speakers located at various locations on the housing 110 in order to optimize clarity of auditory communications to be heard by the consumer.

FIG. 2 also depicts a variety of apertures and/or ports for connecting the CID 100 to external systems/devices. The locations of the apertures and/or ports are purely exemplary, can be moved to many other locations on the housing 110 of the CID 100. The CID 100 can be connected to a printer by means of a printer port/aperture 190. The CID 100 can be connected in a wired manner to a POS system, an electronic shelf display system, the internet, a local area network (LAN), and/or other systems/devices via another port/aperture 191. The CID 100 can also be connected to a power supply via a power supply aperture 192.

Figure 3:
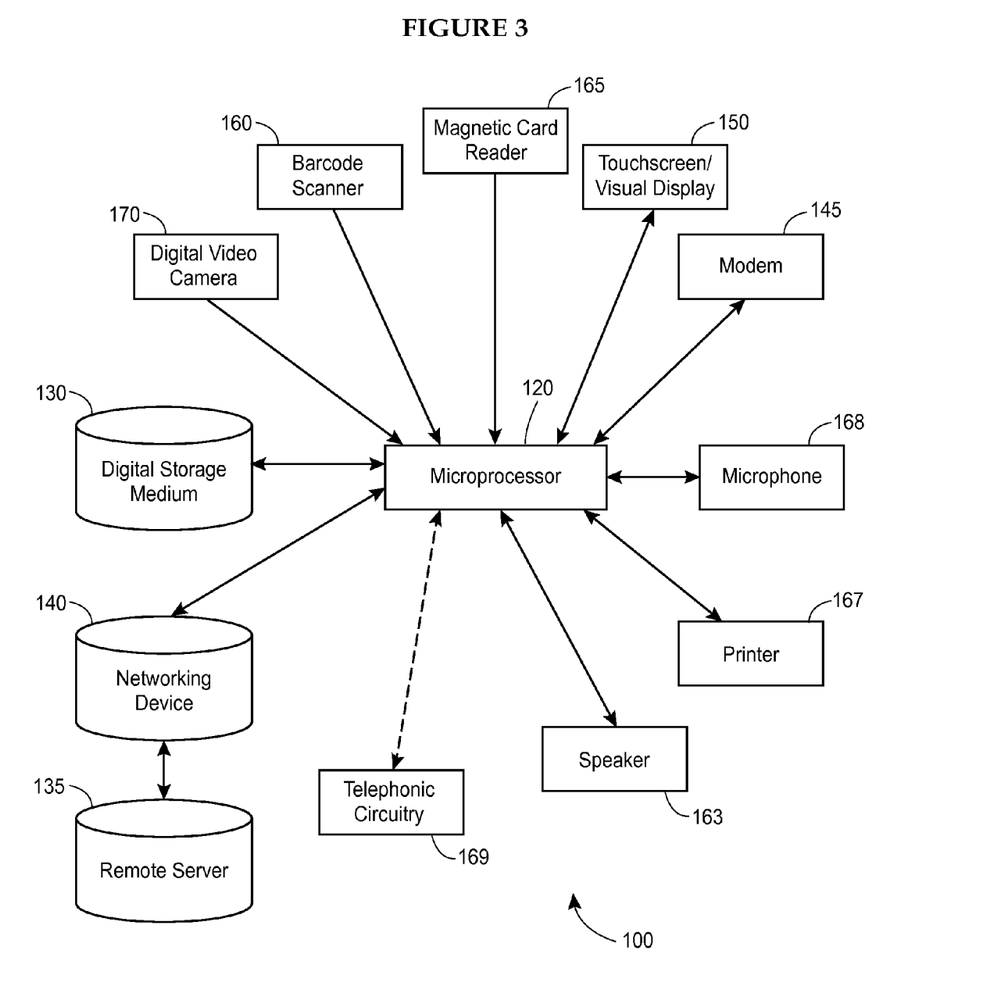
FIG. 3 illustrates a block diagram of an example CID.

FIG. 3 illustrates a block diagram of an example CID 100. The CID 100 may include a microprocessor 120, a digital storage medium 130, a networking device 140, and/or a display 150. The microprocessor 120 may be any processor configured to fetch and execute instructions stored at the digital storage medium 130. In some embodiments, the CID 100 further includes one or more of: a modem 145, a barcode scanner 160, a speaker 163, a magnetic card reader 165, a printer 167, a microphone 168, telephonic circuitry 169, a digital video camera 170, and/or a remote server 135.

The networking device 140 may be in electronic communication with the microprocessor 120 and may be in further electronic communication with a computer network, such as, without limitation, a personal area network, a local area network, and/or a wide area network, such as the internet. Examples of networking devices 140 include, without limitation, wired network devices such as Ethernet network interface cards, or wireless network devices using wireless standards such as WiFi, Bluetooth, and Zigbee (a specification for a suite of high-level communication protocols using small, low-power digital radios, designed to be simpler and less expensive than Bluetooth). In some embodiments the networking devices 140 include a radio-frequency identification (RFID) scanner and/or a near-field communication (NFC) device. In an embodiment, the networking device 140 may be connected to a local area network within a retail store. The local area network may be connected to one or more other systems containing information related to products offered for sale by a retail company. Access to the local area network provides the CID 100 with access to the information contained by the other systems connected to the local area network. In an embodiment, the local area network may be connected to a point-of-sale system (POS) within a retail store.

The digital storage medium 130 may be in electronic communication with the microprocessor 120. Software instructions capable of execution by the microprocessor 120 may be tangibly stored on the digital storage medium 130, or said software instructions may be tangibly stored on a remote server 135 that may be in electronic communication with the microprocessor 120 via the networking device 140. The software may be configured to perform a variety of functions. In some embodiments, the software facilitates the communication between the microprocessor 120 and the local access network, for example, providing an application facilitating the access of specific information stored on any other system that may be also connected to the local area network. In one particular, exemplary embodiment, the software facilitates the communication between the CID 100 and a point of sale system via the local area network (accessible via the networking device 140).

In an embodiment, the CID 100 comprises a modem 145 in electronic communication with the microprocessor 120. The modem 145 allows the CID 100 to directly and/or independently access the internet and/or other systems. Alternatively, the internet and/or other systems may be accessed in a wired or wireless manner, via the networking device 140 connecting to a local area network. In some embodiments the modem 145 is an element of the networking device 140.

In an embodiment, the CID 100 comprises a barcode scanner 160. The barcode scanner 160 may be in electronic communication with the microprocessor 120. The barcode scanner 160 may be configured to read a barcode displayed on a product, product packaging, or a device configured to display a barcode. When a user presents a barcode that may be read by the barcode scanner 160, the microprocessor 120 receives the barcode, accesses the point-of-sale system, identifies the product, accesses the consumer database, and retrieves information to be displayed on the visual display screen 150. Barcodes may be scanned from sources such as, without limitation, insurance cards, drivers' licenses, credit cards, advertisements, products, and/or the like. Types of information retrieved can include, without limitation, product information, product price, other suggested products, demonstrations, advertising material, promotional material, consumer information, and third party information such as, without limitation intended, information related to a consumer's driver's license, insurance card(s), credit card(s), etc. The information retrieved may be chosen based upon a variety of criteria, including, without limitation, product category, user need, health condition, user profile, user demographics, time of day, geographic location, store type, location of the CID 100 within the store, etc.

In an embodiment, the CID 100 includes a radio frequency identification ("RFID") reader in electronic communication with the microprocessor 120 and can be employed in manners analogous to those discussed regarding the barcode reader. Any of a number of products or cards may contain a chip or tag holding identifying information that can be transmitted to the RFID reader. Moreover, the RFID reader may be used to identify a consumer or type of consumer. For example, the RFID reader may receive a radio-frequency (RF) signal from an electronic device of a consumer (e.g., a phone, tablet, or other mobile device) or from a tagged card (e.g., a credit card, rewards card, or identification card). The CID 100 may identify a unique identifier from the RF signal and correlate the identifier to a profile or variable representing the consumer, where the profile or variable may be stored at the digital storage medium 130 or at a storage medium of a system accessible via a network.

In an embodiment, the CID 100 may provide the user with an option to purchase the product associated with the barcode or RFID tag. Further, the CID 100 may provide the user with an option to purchase any product available for purchase at the retail store, as well as products not available for sale at the retail store. For example, the CID 100 may provide the user with an option to purchase an out-of-stock product that is available for purchase over a network.

Information retrieved and displayed on the visual display screen 150 in response to the scanning of the barcode may be sent to another system, such as a computer or smart phone associated with a retail store owner, an advertiser, a retail store owner other than the owner of the retail store in which the CID 100 may be installed, a vendor, and/or an analyst.

The CID 100 may further comprise a magnetic card reader 165 in electronic communication with the microprocessor 120. The magnetic card reader 165 may allow a consumer to enter data from credit or debit cards, gift cards, insurance cards, customer loyalty cards, and other similar sources that contain data. In some exemplary embodiments, without limitation, the magnetic card reader 165 allows a customer to pay for products purchased through the CID 100, enter an insurance claim for an over-the-counter drug that may be covered by a health insurance plan, recharge a phone card or gift card without having to go through a cashier or checkout station, and/or the like. In some embodiments, the CID 100 may identify a consumer based on information received at the magnetic card reader 165.

The CID 100 may comprise a printer 167 in electronic communication with the microprocessor 120. The printer 167 can be used to print/output a variety of items/information for which a consumer may wish to create a hard copy. Examples may include, without limitation, coupons, recipes, assembly instructions, shopping lists, tickets purchased, nutritional information, product ingredient lists, and/or the like.

The CID 100 may additionally comprise a microphone 168 in electronic communication with the microprocessor 120. The software may be configured to include voice recognition capability, which would permit a consumer to input data into the CID 100 via said voice recognition capability.

The CID 100 may also comprise telephonic circuitry and a telephone connection 169, in electronic communication with the microprocessor 120. As noted above, the CID 100 can send a text message or place a phone call to a consumer using the phone contact information included in a loyalty program, for example, and pass product information to the consumer in that manner.

In some instances, the CID 100 further comprises a video capture device 170 in electronic communication with the microprocessor 120. The video capture device may comprise a digital video camera that may be disposed in an aperture in the housing 110, situated so as to image a field outside the housing 110. The field is, ideally but not exclusively, one which the face of a user may be likely to occupy when using the CID 100. In an embodiment, the software may be configured to enable a video conference with a second, remote, digital video camera, or more generally interactive video communication with a second video capture device. In some instances, the software may be configured to capture an image or video of a consumer, which may then be provided via the display 150.

The software may include a program configured to analyze images captured by the video capture device 170 and identify at least one characteristic of the user. The characteristics that can be identified may include, without limitation, age, sex, dwell time, race, and gender. The CID 100 then accesses a consumer database to display information on the visual display screen 150. The information may be retrieved from the consumer database substantially as described above, further being selected based on the criteria identified from the video capture device 170. Types of information displayed can include, without limitation, product information, product price, other suggested products, demonstrations, advertising material, promotional material, etc.

Figure 4:
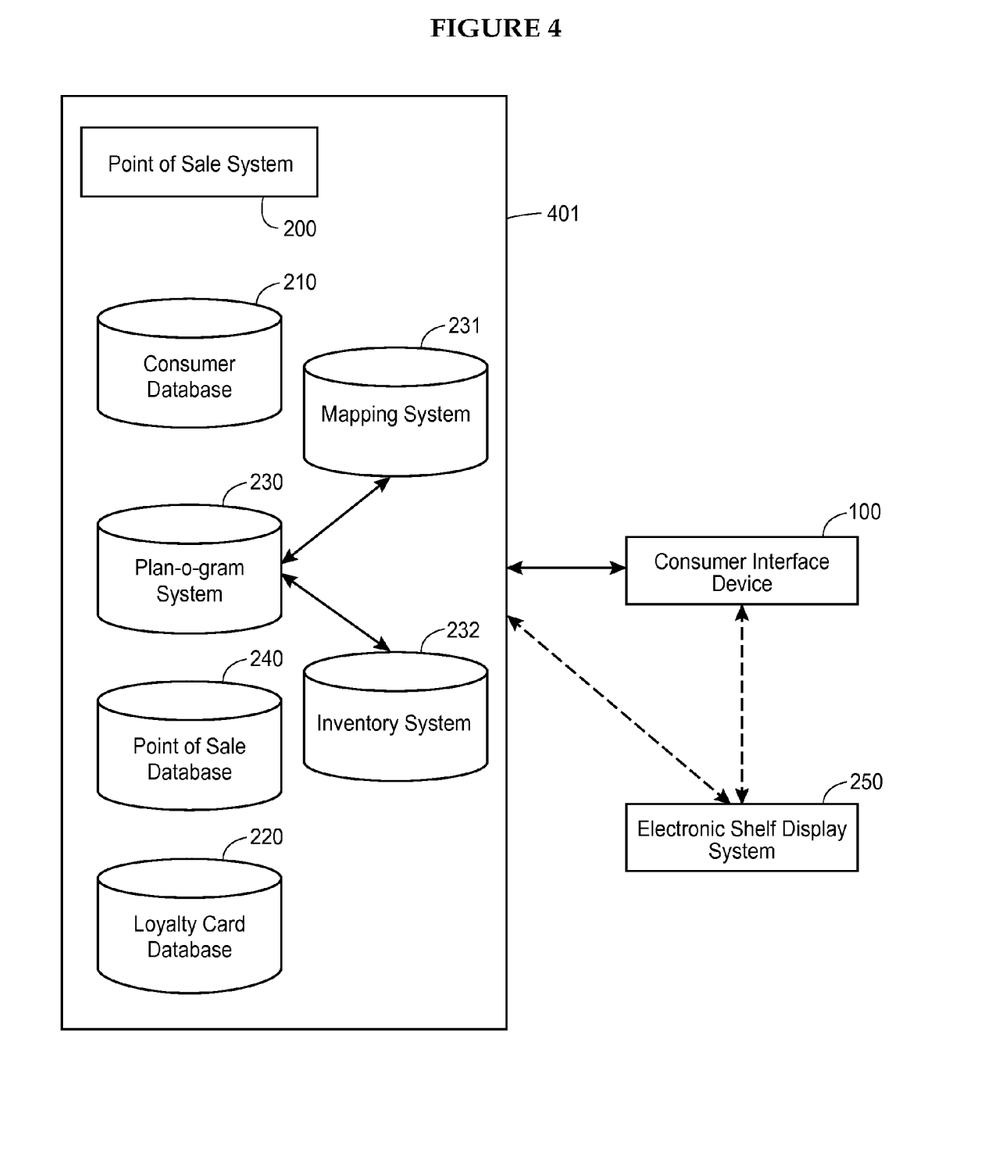
FIG. 4 illustrates a block diagram of a retail system.

FIG. 4 illustrates a block diagram of a retail system 401. The retail system 401 may comprise one or more of: a point-of-sale (POS) 200, a consumer database 210, a planogram system 230, a mapping system 231, an inventory system 232, a point-of-sale database 240, and/or a loyalty card database 220. In an embodiment, the CID 100 may be in electronic communication with the retail system 401. An electronic shelf display system 250 may be in electronic communication with either or both of the retail system 401 and the CID 100.

The CID 100 may be in electronic communication with the consumer database 210 which contains information pertaining, without limitation, to consumer demographics, consumer shopping analytics, and/or shopping history. This information may be uniquely linked to individual consumers/users, or, in an embodiment, the information may be an anonymous aggregate data that cannot be linked to individual consumers.

In an embodiment, the CID 100 may be in electronic communication with the loyalty program database 220 containing the shopping history of individual consumers or users who are signed up for a loyalty program associated with a commercial retailer.

The CID 100 may access a planogram system 230, which may or may not be a component of the POS system 200, to direct the consumer to the location of the product within the retail store. The planogram system 230 may be representative of the particular retail store, or of a central corporate system. The planogram system 230 may include a mapping system 231 for determining where a product may be found on a store's (or another store's) shelves. The planogram system 230 may or may not include an inventory system 232 for the particular store and/or other stores (or retailers). The planogram system 230 may also include, accessible within the local area network, product content such as product information, product price, demonstrations, advertising material, and promotional material.

In an embodiment, the CID 100 may indicate the location, within a store, of a product associated with the barcode or RFID or any other product contained within the information displayed to the user. The CID 100 may further cooperate with a navigational system to direct the user to the location of a product within the store. For example, the CID 100 may receive the location of the product within the store and determine a route to the product, which may then be displayed to the user. The CID 100 may also display a graphic indicating a shelf placement of the product so that the user knows precisely where to find the product. The CID 100 and/or navigational system may interact with the planogram database and/or the inventory system 232 to generate the navigation display. For example, the CID 100 may query the inventory system 232 to determine whether a product may be in-stock and to determine where a product may be located. Similarly, the planogram database 230 may be queried to determine shelf placement for a product.

In an embodiment, the software may be configured to identify a user by utilizing at least two of the above characteristics. Identifying the user may allow the CID 100 to access the loyalty program database 220 and retrieve or otherwise receive information regarding user demographics, shopping history, shopping preferences, etc. of the particular user. The information retrieved from the loyalty program database 220 may be used in the retrieval of information to be displayed on a visual display screen substantially as described above.

Alternatively, the user may be identified using a barcode scanner or a magnetic card reader to input information from a consumer loyalty card into the CID 100. Information may then be retrieved from the loyalty program database 220 and used in the retrieval of information to be displayed on a visual display screen.

Once the user has been shown the information as described above, if that user may be enrolled in the loyalty program, that user's purchasing decision may be tracked via the loyalty program database 220. The user's purchase decision, i.e. whether they decided to purchase a product associated with the information displayed to the user (i.e., product content), may be tracked and associated with the information displayed to the user. That association may be sent to a another system, such as a computer associated with a retail store owner, an advertiser, a retail store owner other than the owner of the retail store in which the CID 100 may be installed, a vendor, and/or an analyst.

The electronic shelf display system 250 may be installed on shelves in the retail store, and may interact with the CID 100 to indicate the location of the selected product to the consumer. Further, the electronic shelf display system 250 may be implemented to direct the consumer to the selected product. In some instances, the CID 100 may communicate with the electronic shelf display system 250 to illuminate part of the electronic shelf display system 250 near the selected product, allowing the selected product to be easily identified.

Method of Interacting with a Consumer

Disclosed herein may be an example method of using a CID to interact with a consumer.

Figure 5:
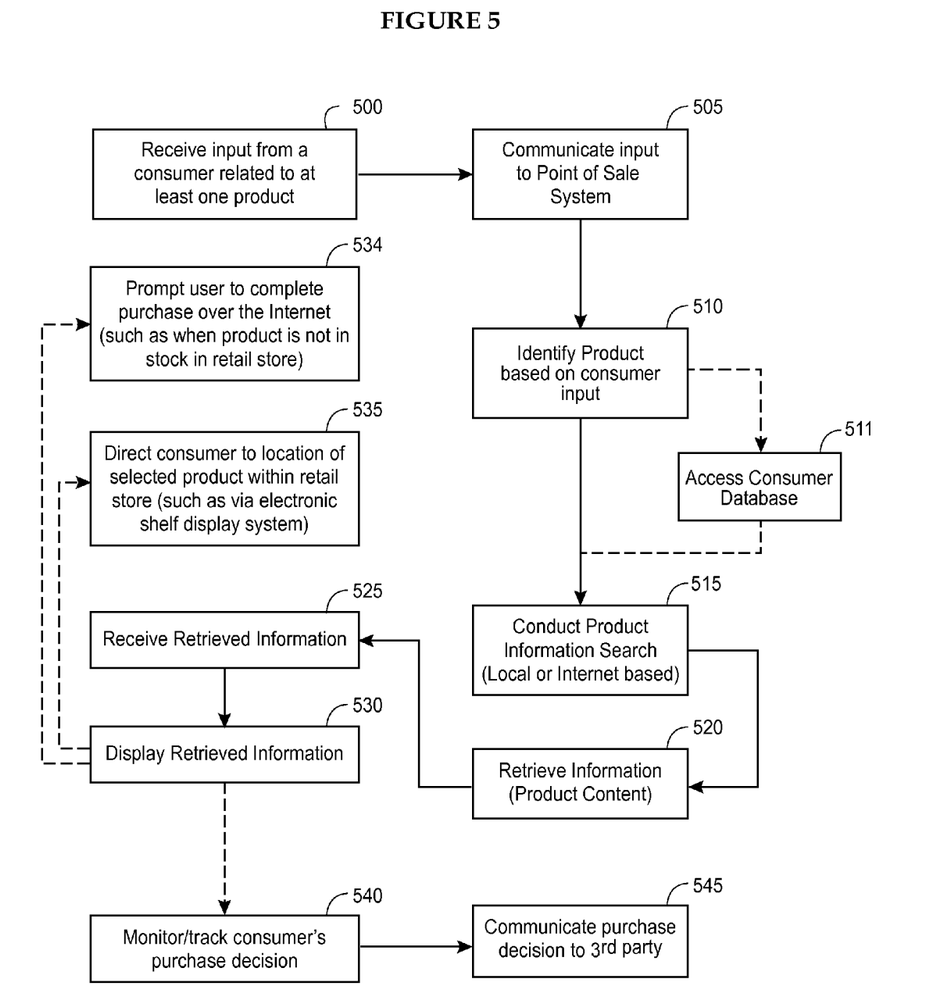
FIG. 5 shows an example method of interacting with a consumer through the use of a CID.

FIG. 5 shows an example method of interacting with a consumer through the use of a CID. The example method may be implemented, in whole or in part, on one or more devices or systems such as the CID 100 of FIG. 1 or the POS system 200 of FIG. 4. The example method may be saved as a set of instructions, routines, programs, or modules on a memory including a tangible computer-readable medium such as the digital storage medium 130 of FIG. 3.

A consumer may interact with the CID, which receives input from the consumer related to at least one product (block 500). In an embodiment, this input may occur via a barcode scanned through the use of a barcode scanner. In an embodiment, this input may be a search query. For example, the user may input the search query by touching a touchscreen at one or more locations corresponding to graphical elements representing keyboard symbols or some other input function (e.g., a "back" button). The CID may communicate at least some of this input to a POS system (block 505). The POS system identifies at least one product based on the consumer input (block 510). In some embodiments, a consumer database may be then accessed (block 511), in order to aid product identification. The POS system then conducts a product information search (block 515), which may be conducted either locally via the local network or over the internet. The product information search may be modified by criteria such as product category, user need, health condition, user demographics, time of day, geographic location, and store type. The POS system then retrieves product information, including product content related to the at least one product (block 520) from the local network or the internet. Product content comprises content types such as product information, product price, demonstrations, advertising material, promotional material, and/or the like. This information/product content may be communicated to the CID, which receives the retrieved information/product content (block 525). The CID then displays this product content (block 530) to the consumer via a visual display.

In some embodiments, the CID may provide the option of purchasing the selected product via a network connection (e.g., via the internet) (block 534), rather than physically purchasing it at the retail store. Such a network purchase may include establishing communication with a server located in-store or out-of-store. For example, the network purchase may include connecting to the retailer's website, hosted in-store or elsewhere, in order to purchase the product. A retailer may wish to offer network purchases to generate sales, for example, in situations where the product is not in stock at the particular store being visited by the consumer, or when the product is only sold through the retailer's website. In some instances, the network purchase may include connecting to the website of a second retailer to allow the consumer to purchase the product. Connecting to the website of a second retailer may be desirable, for example, if the first retailer does not carry (or intend to carry) the selected product.

In some embodiments, the CID may then direct the consumer to the location of the at least one product within the retail store (block 535). This may be accomplished through the use of an electronic shelf display system, such as those disclosed in co-pending and co-owned U.S. Patent Applications 20100249994 and 20120120327.

In some embodiments, after the product content is displayed to the consumer, the CID and/or the POS system may monitor/track the consumer's subsequent purchase decision (block 540) (i.e., whether or not the consumer purchases the selected product). This monitoring/tracking may then be communicated to a third party or system (block 545), such as the retail store owner, an advertiser, a second retailer, a vendor, and/or an analyst. The monitoring/tracking may be utilized to determine a correlation between certain product content and decisions to purchase a product.

Figure 6:
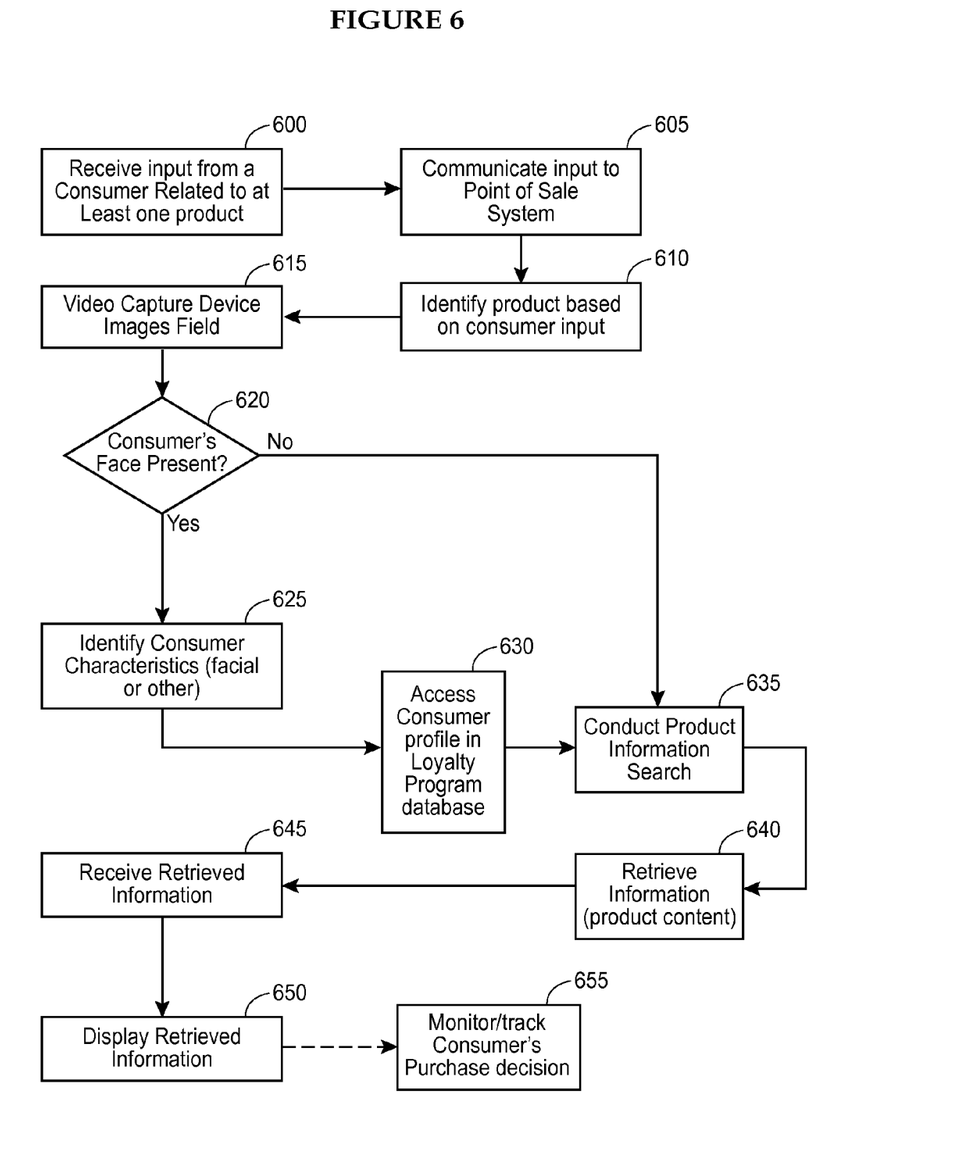
FIG. 6 shows an example method of accessing a consumer profile in a loyalty program database through a facial recognition implementation of the video capture system.

Method of Accessing Consumer Profile in Loyalty Program Database Through Facial Recognition Implementation of Video Capture System FIG. 6 shows an example method of accessing a consumer profile in a loyalty program database through a facial recognition implementation of the video capture system. The example method may be implemented, in whole or in part, on one or more devices or systems such as the CID 100 of FIG. 1 or the POS system 200 of FIG. 4. The example method may be saved as a set of instructions, routines, programs, or modules on memory including a tangible computer-readable medium such as the digital storage medium 130 of FIG. 3.

A CID may activate the video capture system to image the field typically occupied by the face of a user engaging the CID (block 615). The CID may then determine whether the consumer's face is present in the field (block 620). If so, then the software implementing the facial recognition capability attempts to identify facial and other characteristics of the user engaging the CID (block 625), based on a user profile (including a facial image) for the consumer (which may be maintained in a consumer database 210, a loyalty program database 220, or the POS database 240). In some embodiments, other biometric identification techniques may be used to identify characteristics of the user (e.g., a fingerprint scan, and iris scan, etc). These characteristics may include, without limitation, age, sex, dwell time, race, and gender. In an embodiment, the CID attempts to identify the consumer based on at least one of these characteristics. In some embodiments, the identification of the consumer can be verified based on at least two of the identified characteristics, as compared with a stored profile of the consumer.

In some instances, prior to the CID activating the video capture system, a consumer may interact with the CID, where the CID receives input from the consumer related to at least one product (block 600). In an embodiment, the input may be via a barcode scanned through the use of the barcode scanner 160 shown in FIG. 3. In an embodiment, the input may be a search query presented to the user by the CID. The CID may communicate at least some of this input to a POS system (block 605). The POS system may identify at least one product based on the consumer input (block 610).

Once the identity of the present consumer is determined and/or verified, the POS system and/or CID may access a consumer profile uniquely linked to the present consumer in a loyalty program database (block 630). The loyalty program account tied to the consumer may be one of a plurality of such accounts contained in the loyalty program database 220 shown in FIG. 4. The POS system then conducts a product information search (block 635), which may be conducted either locally via the local network or over the internet. The product information search may be modified by criteria such as product category, user need, health condition, user demographics, time of day, geographic location, and store type. The POS system then retrieves information, including product content related to the at least one product (block 640) from the local network or the internet. Product content comprises content types such as product information, product price, demonstrations, advertising material, promotional material, and/or the like. This information/product content may be communicated to the CID, which receives the retrieved information/product content (block 645). The CID may then display the product content (block 650) to the consumer via a visual display.

In some embodiments, after the product content may be displayed to the consumer, the CID and/or the POS system may monitor/track the consumer's subsequent purchase decision (block 655) (i.e., whether or not the consumer purchases the selected product). The purchase decision may be associated to the product content. For example, the CID or the POS system may determine whether the product content resulted in a sale, or the degree to which the product content resulted in a sale. An indication of the success rate or general correlation with success may be determined for the product content. Such information may be tracked and stored to later evaluate the effectiveness of product content. Effectiveness may be evaluated in a general sense or within a particular context. For example, a particular product content may be successful with consumers sharing a first demographic characteristic but unsuccessful with consumers sharing a second demographic characteristic. As another example, the product content may be more or less successful depending on the time of day, the location of the CID, the brand of a product, the category of a product, etc. In any event, this monitoring/tracking can then be communicated to a third party or system, such as the retail store owner, an advertiser, a second retailer, a vendor, an analyst, and/or the like. Tracking can comprise determining the availability of the selected product either in-store or online, accessing the POS system, and determining whether the purchase decision related to a product available in-store.

In an alternative embodiment, the user may be identified at (blocks 620-625) through voice recognition in place of facial recognition, utilizing the microphone 168.

Figure 7:
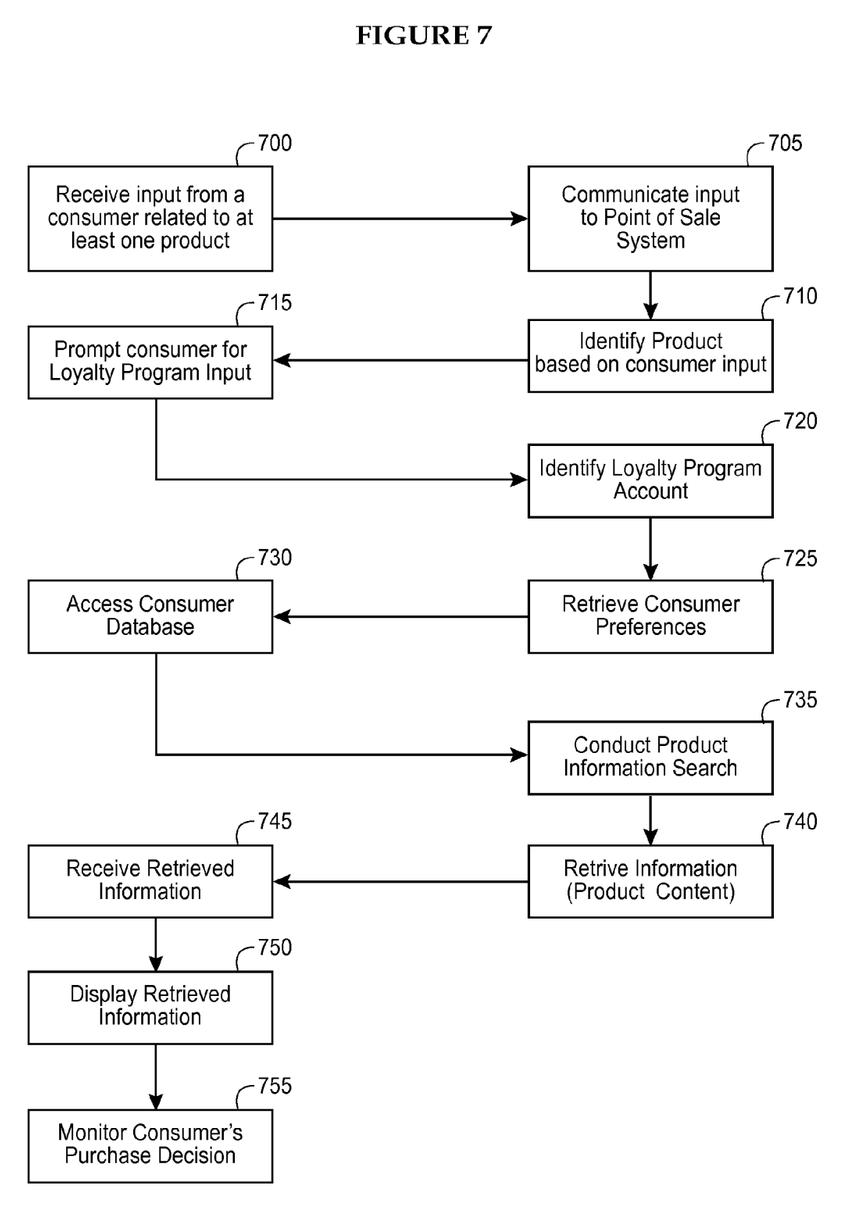
FIG. 7 shows an example method of evaluating the sales-promoting capacity of product content via a CID.

Method of Evaluating Sales-Promoting Capacity of Product Content Via the Consumer Interface Device FIG. 7 shows an example method of evaluating the sales-promoting capacity of product content via a CID. The example method may be implemented, in whole or in part, on one or more devices or systems such as the CID 100 of FIG. 1 or the POS system 200 of FIG. 4. The example method may be saved as a set of instructions, routines, programs, or modules on a memory including a tangible computer-readable medium such as the digital storage medium 130 of FIG. 3.

A consumer interacts with a CID, which receives input from the consumer related to at least one product (block 700). In an embodiment, this input may be via a barcode scanned through the use of the barcode scanner 160 shown in FIG. 3. In an embodiment, this input may be a search query presented to the user by the CID 100. The CID 100 communicates at least some of this input to a POS system (block 705). The POS system identifies at least one product based on the consumer input (block 710). The CID may then prompt the consumer for loyalty program input (block 715). This input can be a login instruction from the consumer that accesses the consumer's loyalty program account. The loyalty program input may be then used to identify a loyalty program account tied to the particular consumer (block 720) in a loyalty program database. The loyalty program account tied to the consumer may be one of a plurality of such accounts contained in the loyalty program database 220 shown in FIG. 4.

In some instances, the CID or POS system may identify a product based on a predetermined schedule, a random selection, product availability, the proximity of a product to the CID or a component of the CID (e.g., the product may be on a nearby shelf or may be located within a predetermined range (five meters, for example) of the CID). For example, the CID may detect the presence of the consumer by receiving information associated with the user or a device of the user. In particular, the CID may receive a radio-frequency signal transmitted from a device (such as a phone, tablet, or RFID tag) controlled or carried by the consumer. Alternatively, the CID may capture biometric information from the consumer. In some embodiments the CID or the POS system may identify at least one product based on criteria such as a detected demographic characteristic of the consumer, time of day, location of the one product, location of the CID, location of the consumer, etc.

The POS system may then conduct a product information search (block 735), which may be conducted either locally via the local network or over the internet. The product information search may allow the POS system, for example, to determine whether a product may be available in-store for purchase and/or where the product may be located in the store. The product information search may be modified by criteria such as product category, user need, health condition, user demographics, time of day, geographic location, and store type. The POS system may then retrieve information, including product content related to the at least one product (740) from the local network or the internet. Product content comprises content types such as product information, product price, demonstrations, advertising material, promotional material, and/or the like. The product content may be presented as one or more still images, video, audio, or any combination thereof. This information/product content may be communicated to the CID, which receives the retrieved information/product content (block 745). The CID then displays this product content (block 750) to the consumer via a visual display.

In some embodiments, after the product content is displayed to the consumer, the CID and/or the POS system may monitor/track the consumer's subsequent purchase decision (block 755), i.e., whether or not the consumer purchases the selected product. This monitoring/tracking can then be communicated to a third party or system, such as the retail store owner, an advertiser, a second retailer, a vendor, an analyst, and/or the like. Tracking may comprise determining the availability of the selected product either in-store or online, accessing the POS system, and determining whether the purchase decision related to a product available in-store. If a purchase decision represents a decision to purchase the selected product by the consumer in-store, tracking may also comprise determining the in-store availability of the product, recording the purchase in the consumer's loyalty program account, and associating the product content displayed to the consumer with the selected product and the purchasing decision (block 760).

In some embodiments, the CID may provide the option of purchasing the selected product via network (e.g., via the internet), rather than physically purchasing it at the retail store. The online purchase can include connecting to the retailer's website and instructing delivery to an address associated with the consumer. Online purchase can be an attractive additional capability for the retailer to accommodate a consumer in the event that the product may be not in stock in the particular store or if the product may be only sold through the retailer's website due to logistical reasons pertinent to storage, transportation, and/or the like.

In some embodiments, a network purchase capability may enable, for example, connecting to a website of a second retailer to allow the consumer to purchase the product in the event that the first retailer does not carry (or intend to carry) the selected product. As another example, the first retailer may have no interest in matching a deeply discounted price offered by the second retailer, but helping the consumer purchase at a lower price may enable the first retailer to build credibility with the customer and develop customer loyalty.

In some embodiments, the CID may be accessed and/or configured over a network. The CID, or a server associated with the CID, may host a website offering the same functionality that is offered via the in-store display of the CID. For example, a user may look-up a product or purchase a product by accessing the website. Similarly, the CID, or a server associated with the CID, may interact with an application running on a device (such as a tablet or phone), allowing a user to remotely access services provided at the CID.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA)/field-programmable gate array (FPGA), etc.). A hardware module is a tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

The use of the terms "a" and "an" and "the" and similar referents in the context of describing the invention is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate better the feature and does not pose a limitation on the scope of the disclosure unless otherwise claimed. No language in the specification should be construed as indicating any non-claimed element as essential to the disclosure.

While the foregoing description of the present system has been shown and described in connection with various particular embodiments and applications thereof, it has been presented for purposes of illustration and description and is not intended to be exhaustive or to limit the electronic system to the particular embodiments and applications disclosed. It will be apparent to those having ordinary skill in the art that a number of changes, modifications, variations, or alterations to the system as described herein may be made, none of which depart from the spirit or scope of the present disclosure. The particular embodiments and applications were chosen and described to provide the best illustration of the principles of the system and its practical application to thereby enable one of ordinary skill in the art to utilize the system in various embodiments and with various modifications as are suited to the particular use contemplated. All such changes, modifications, variations, and alterations should therefore be seen as being within the scope of the present disclosure.

What is claimed is:

1. A computer-implemented method for interactive shopping at a retail store, the method comprising:
    (A) displaying at a touchscreen of a consumer interface device (CID), mounted to a shelf or a kiosk via a hardware mount at a retail store so that consumers can interact with the CID, a display for navigating to a first product for sale at a retail store in response to a user selecting via the touchscreen of the CID the first product by:
        (i) causing a processor of the CID, coupled to the touchscreen, to determine whether the touchscreen received user-input representing the user selecting the first product;
        (ii) causing the processor to identify, based on the received user-input, the first product;
        (iii) causing the processor to generate a query, the query representing a request for information associated with the first product;
        (iv) causing the processor to transmit the query to an inventory system, wherein the inventory system includes data regarding one or more products available for purchase at the retail store;
        (v) causing the processor to receive a response to the query;
        (vi) causing the processor to determine, based on the response to the query, that the first product is available for in-store purchase;
        (vii) causing the processor to receive information indicating a location of the first product within the retail store, the information including shelf placement information received from a planogram system that indicates a placement on a shelf for the first product; and
        (viii) causing the processor to provide at the touchscreen of the CID the display for navigating to the first product, the display including an image of the first product on the shelf according to the shelf placement information; and
    B) displaying, at the touchscreen of the CID, an interface for requesting delivery of the first product to an address outside the retail store associated with the user so that the user can purchase the first product without retrieving the first product in-store.

2. The computer-implemented method of claim 1, wherein causing the processor to identify, based on the received user-input, a first product, comprises causing the processor to determine that the user-input received at the touchscreen represented a request for information regarding the first product.

3. The computer-implemented method of claim 1 further comprising causing the processor to determine a route, within the retail store, to the first product by including one or more images corresponding to reference points on the determined route.

4. The computer-implemented method of claim 1, further comprising causing the processor to provide, at the touchscreen, product content associated with the first product.

5. The computer-implemented method of claim 4, wherein the product content associated with the first product comprises at least one of:
    (i) a message about the first product;
    (ii) one or more directions for using the first product;
    (iii) a comparison to one or more second products;
    (iv) a list of features of the first product;
    (v) a promotion associated with the first product;
    (vi) an image illustrating use of the first product;

(vii) an image illustrating a user interacting with the first product; or
(viii) an image of the first product.

6. The computer-implemented method of claim 1, further comprising:
   causing the processor to determine the user-input was received from a user interacting with the touchscreen;
   causing the processor to associate the user with a unique identifier; and
   causing the processor to associate a purchase decision of the user to the unique identifier, the purchase decision indicating whether the user purchased the first product at the retail store.

7. The computer-implemented method of claim 1, further comprising:
   causing the processor to provide a display including a touch-sensitive graphic element, at the touchscreen;
   causing the processor to detect a contact with the touchscreen at a location on the touchscreen corresponding to the touch-sensitive graphic element; and
   causing the processor coupled to a digital stored medium to store, to the digital storage medium, an indicator that the navigation associated with first product has been reported as faulty.

8. The computer-implemented method of claim 1, further comprising:
   causing the processor coupled to a lighting apparatus to activate the lighting apparatus such that (i) light is projected onto the first product, or (ii) signage associated with the first product is illuminated.

9. A consumer interface device for providing an interactive shopping experience in a retail store, the consumer interface device (CID) comprising:
   a touchscreen mounted to a shelf or a kiosk via a hardware mount at a retail store so that consumers can interact with the CID;
   a processor coupled to the touchscreen;
   a networking device coupled to the processor; and
   a digital storage medium, coupled to the processor, including non-transitory computer readable instructions that, when executed at the processor, cause the CID to display at the touchscreen a display for in-store navigation to a first product in response to a user selecting via the touchscreen the first product, the non-transitory computer readable instructions including instructions to cause the processor to:
   (a) determine the touchscreen has received user-input representing the user selecting the first product;
   (b) identify, based on the received user-input, the first product;
   (c) generate one or more queries representing one or more requests for location information regarding the first product;
   (d) transmit, via the networking device, the one or more queries;
   (e) receive, via the networking device, one or more responses to the one or more queries that include the location information;
   (f) determine, based on the one or more responses:
   (i) availability of the first product for in-store purchase,
   (ii) a location of the first product within the retail store, and
   (iii) when the first product is located on a shelf, an indication of a position of the first product on a shelf;
   (g) provide, at the touchscreen, the display for in-store navigation to the first product, wherein the touchscreen displays an image showing the position of the first product on the shelf when an indication of shelf position has been received; and
   h) display, at the touchscreen, an interface for requesting delivery of the first product to an address outside the retail store associated with the user so that the user can purchase the first product without retrieving the first product in-store.

10. The consumer interface device of claim 9, further comprising:
    a housing attached to the touchscreen; and
    a hardware mount for attaching the housing to a support apparatus in the retail store.

11. The consumer interface device of claim 9, wherein the non-transitory computer readable instructions that cause the processor to determine the touchscreen has received user-input further comprise instructions that, when executed, cause the processor to:
    provide, at the touchscreen, a display including a touch-sensitive graphic element;
    detect a contact at a location on the touchscreen, the location corresponding to the touch-sensitive graphic element provided at the touchscreen; and
    determine the contact is an input.

12. The consumer interface device of claim 11, wherein the non-transitory computer readable instructions, when executed, further cause the processor to determine that the user-input represents a request for information regarding the first product.

13. The consumer interface device of claim 9, wherein the non-transitory computer readable instructions, when executed, further cause the processor to provide, at the touchscreen, product content associated with the first product.

14. The consumer interface device of claim 13, wherein the product content associated with the first product comprises at least one of:
    (i) a message about the first product;
    (ii) one or more directions for using the first product;
    (iii) a comparison to one or more second products;
    (iv) a list of features of the first product;
    (v) a promotion associated with the first product;
    (vi) an image illustrating use of the first product;
    (vii) an image illustrating a user interacting with the first product; or
    (viii) an image of the first product.

15. The consumer interface device of claim 9, wherein the non-transitory computer readable instructions, when executed, further cause the processor to:
    determine the user-input was received from a user interacting with the touchscreen;
    associate the user with a unique identifier; and
    transmit the unique identifier to a point-of-sale system for tracking a purchase decision of the user, the purchase decision indicating whether the user purchased the first product at the retail store.

16. The consumer interface device of claim 9, wherein the instructions that cause the processor to provide, at the touchscreen, a display for in-store navigation to the first product, comprise instructions that, when executed, cause the processor to:
    transmit a command to a lighting system to activate a lighting apparatus such that one or more of the following occurs: (i) light is projected onto the first product, or (ii) signage associated with the first product is illuminated.

17. A tangible computer readable medium including non-transitory computer readable instructions that, when executed, cause one or more processors to:
- determine a touchscreen of a consumer interface device (CID) has received user-input representing a user selecting a first product, the CID mounted to a shelf or a kiosk via a hardware mount at a retail store so that consumers can interact with the CID;
- in response to receiving the user-input:
  - (a) identify, based on the received user-input, the first product;
  - (b) generate one or more queries representing one or more requests for information regarding the first product;
  - (c) transmit, via a networking device, the one or more queries;
  - (d) receive, via the networking device, one or more responses to the one or more queries;
  - (e) determine, based on the one or more responses, each of:
    - (i) whether the first product is available for in-store purchase,
    - (ii) when the first product is available for in-store purchase, a location of the first product within the retail store, and
    - (iii) when the first product is located on a shelf, an indication of a position of the first product on a shelf;
  - (f) provide, at the touchscreen, a display for in-store navigation to the first product, wherein the touchscreen displays an image showing the position of the first product on the shelf when an indication of shelf position has been received; and
  - (g) display, at the touchscreen, an interface for requesting delivery of the first product to an address outside the retail store associated with the user so that the user can purchase the first product without retrieving the first product in-store.

18. The tangible computer readable medium of claim 17, wherein the non-transitory computer readable instructions that cause the one or more processors to determine the touchscreen has received user-input further comprise instructions that, when executed, cause the one or more processors to:
- provide, at the touchscreen, a display including a touch-sensitive graphic element;
- detect a contact at a location on the touchscreen, the location corresponding to the touch-sensitive graphic element provided at the touchscreen; and
- determine the contact is an input.

19. The tangible computer readable medium of claim 18, wherein the non-transitory computer readable instructions, when executed, further cause the one or more processors to determine that the user-input represents a request for information regarding the first product.

20. The tangible computer readable medium of claim 17, wherein the non-transitory computer readable instructions, when executed, further cause the one or more processors to provide, at the touchscreen, product content associated with the first product.

21. The tangible computer readable medium of claim 20, wherein the product content associated with the first product comprises at least one of:
- (i) a message about the first product;
- (ii) one or more directions for using the first product;
- (iii) a comparison to one or more second products;
- (iv) a list of features of the first product;
- (v) a promotion associated with the first product;
- (vi) an image illustrating use of the first product;
- (vii) an image illustrating a user interacting with the first product; or
- (viii) an image of the first product.

22. The tangible computer readable medium of claim 17, wherein the non-transitory computer readable instructions, when executed, further cause the one or more processors to:
- determine the user-input was received from a user interacting with the touchscreen;
- associate the user with a unique identifier; and
- transmit the unique identifier to a point-of-sale system for tracking a purchase decision of the user, the purchase decision indicating whether the user purchased the first product at the retail store.

23. The tangible computer readable medium of claim 17, wherein the instructions that cause the processor to provide, at the touchscreen, a display for in-store navigation to the first product, comprise instructions that, when executed, cause the one or more processors to:
- transmit a command to a lighting system to activate a lighting apparatus such that one or more of the following occurs: (i) light is projected onto the first product, or (ii) signage associated with the first product is illuminated.

24. The tangible computer readable medium of claim 17, wherein the non-transitory computer readable instructions, when executed, further cause the one or more processors to:
- determine the user-input was received from a user interacting with the touchscreen;
- associate the user with a unique identifier;
- identify a consumer profile associated with the unique identifier, the consumer profile relating to the user or a user-segment, wherein the consumer profile includes one or more of historical data or preference data; and
- update the consumer profile to reflect that the user was provided in-store navigation to the first product.

25. The tangible computer readable medium of claim 20, wherein the non-transitory computer readable instructions, when executed, further cause the one or more processors to:
- determine the user-input was received from a user interacting with the touchscreen;
- associate the user with a unique identifier;
- identify a consumer profile associated with the unique identifier, the consumer profile relating to the user or a user-segment, wherein the consumer profile includes one or more of historical data or preference data; and
- select the product content, to be provided at the touchscreen, based on the consumer profile.

* * * * *